(12) United States Patent
Rimini (10) Patent No.: US 11,533,114 B2
(45) Date of Patent: *Dec. 20, 2022

(54) METHOD AND APPARATUS FOR MAXIMUM PERMISSIBLE EXPOSURE PROXIMITY SENSOR FAULT DETECTION

(71) Applicant: QUALCOMM Incorporated, San Diego, CA (US)

(72) Inventor: Roberto Rimini, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/447,303

(22) Filed: Sep. 10, 2021

(65) Prior Publication Data

US 2021/0409129 A1 Dec. 30, 2021

Related U.S. Application Data

(63) Continuation of application No. 17/144,941, filed on Jan. 8, 2021, now Pat. No. 11,146,343, which is a (Continued)

(51) Int. Cl.
*H04B 17/13* (2015.01)
*H04B 1/3827* (2015.01)
*H04B 1/04* (2006.01)

(52) U.S. Cl.
CPC .............. *H04B 17/13* (2015.01); *H04B 1/04* (2013.01); *H04B 1/3838* (2013.01); *H04B 2001/0408* (2013.01)

(58) Field of Classification Search
CPC ........ H04B 17/13; H04B 1/04; H04B 1/3838; H04B 2001/0408
See application file for complete search history.

(56) References Cited

U.S. PATENT DOCUMENTS 9,929,763 B1 * 3/2018 Zheng ................. H04B 1/3838
10,897,318 B2 1/2021 Rimini
(Continued)

FOREIGN PATENT DOCUMENTS

| CN | 106021010 B | 11/2018 |
|---|---|---|
| WO | WO-2016190974 A1 | 12/2016 |
| WO | WO-2019022719 A1 | 1/2019 |

OTHER PUBLICATIONS

International Search Report and Written Opinion—PCT/US2020/027929—ISA/EPO—dated Jul. 14, 2020.

*Primary Examiner* — Freshteh N Aghdam
(74) *Attorney, Agent, or Firm* — Qualcomm Incorporated (57) ABSTRACT

Techniques are provided which may be implemented using various methods and/or apparatuses in a mobile device to address maximum permissible exposure (MPE) proximity sensor failure. A mobile device may include a maximum permissible exposure (MPE) sensor control unit to actively monitor signals associated with proper operation of the MPE proximity sensors. Upon detecting an anomaly in any of these signals, such as a value drop below a given threshold, an MPE sensor control Unit will inform an AP (application processor, or other processor or controller) which in turn trigger display of a warning message on the display of the mobile device or the issuance of other warnings such an audible or tactile alert to inform the end user about the maximum permissible exposure (MPE) proximity sensor malfunction and/or notify the end use of a condition resulting in deactivation of the 5G new radio transceiver.

20 Claims, 4 Drawing Sheets

Related U.S. Application Data continuation of application No. 16/549,162, filed on Aug. 23, 2019, now Pat. No. 10,897,318.

(60) Provisional application No. 62/834,593, filed on Apr. 16, 2019.

(56) References Cited

U.S. PATENT DOCUMENTS

| | | | |
|---|---|---|---|
| 11,146,343 B2 | 10/2021 | Rimini | |
| 2008/0132283 A1 | 6/2008 | Ponce De Leon et al. | |
| 2009/0040037 A1* | 2/2009 | Schraga | G05D 1/0088 340/459 |
| 2011/0059776 A1* | 3/2011 | Seo | H03K 17/941 455/566 |
| 2014/0354567 A1* | 12/2014 | Park | G06F 3/0488 345/173 |
| 2016/0150399 A1* | 5/2016 | Zhang | H04M 1/72454 455/418 |
| 2016/0211876 A1* | 7/2016 | Yamamoto | H04B 1/3838 |
| 2017/0066334 A1 | 3/2017 | Sindia et al. | |
| 2017/0066399 A1* | 3/2017 | Villacres Mesias | B60R 21/213 |
| 2018/0287651 A1* | 10/2018 | Fernando | H04B 1/3838 |
| 2019/0074854 A1* | 3/2019 | Raghavan | H04W 52/42 |
| 2019/0200365 A1* | 6/2019 | Sampath | H04B 1/3838 |
| 2020/0336222 A1 | 10/2020 | Rimini | |

* cited by examiner

METHOD AND APPARATUS FOR MAXIMUM PERMISSIBLE EXPOSURE PROXIMITY SENSOR FAULT DETECTION

RELATED APPLICATIONS

This application is a continuation of prior U.S. patent application Ser. No. 17/144,941, entitled "A Method and Apparatus for Maximum Permissible Exposure Proximity Sensor Fault Detection", filed Jan. 8, 2021, which is a continuation of U.S. patent application Ser. No. 16/549,162, entitled "A Method and Apparatus for Maximum Permissible Exposure Proximity Sensor Fault Detection", granted as U.S. Pat. No. 10,897,318, filed Aug. 23, 2019, which claims the benefit of U.S. Provisional Application No. 62/834,593, entitled "Maximum Permissible Exposure Detection and Faulty MPE Proximity Sensor Detection", filed Apr. 16, 2019, all of which are assigned to the assignee hereof and incorporated herein by reference.

BACKGROUND

1. Field

The subject matter disclosed herein relates to mobile devices, and more particularly to methods, messaging and apparatuses for use in or with a mobile device to monitor maximum permissible exposure detection and to detect a faulty maximum permissible exposure sensor.

2. Information

Next generation 5G cellular systems utilizes the millimeter wave (mmW) portion of the spectrum to exploit availability of large bandwidth to achieve unprecedented data rates of tens of Gbps/sec. The radio transmission in mmW spectrum (i.e. 28 GHz) needs to meet stringent exposure requirements for living objects and human tissue. FCC mandates implement a maximum permissible exposure (MPE) of 1 mW/cm$^2$ at 28 GHz. This exposure limit may be exceeded when the mobile device is transmitting at high Tx power with high beamforming gain. Therefore, it is important to know when living beings, animals and other objects of concern are in proximity.

SUMMARY

In an embodiment, the maximum permissible exposure (MPE) sensor control unit may utilize hardware and/or software to detect a receiver fault inferred from modem processing. In various embodiments, a receiver fault detection algorithm may monitor the TxPwr at the transmitter output, measure the power level of the mutual coupling signal energy, monitor the received signal level of H and/or V polarization components, or monitor a capacitive sensor to control the voltage signals across the capacitive sensor to ensure that the sensor is operating correctly. It is understood that these embodiments are not limiting and that other receiver fault detection embodiments may be utilized.

In an embodiment, a mobile device may perform a method of detecting a failure in a maximum permissible exposure (MPE) proximity sensor, comprising: measuring an indication of operation of the MPE proximity sensor; determining whether the indication of operation of the MPE proximity sensor is less than a threshold; in response to a determination that the indication of operation of the MPE proximity sensor is less than the threshold, sending a request for user messaging to an application processor; and issuing an MPE proximity sensor failure alert.

In an embodiment, a mobile device for detecting a failure in a maximum permissible exposure (MPE) proximity sensor, may comprise: at least one memory; at least one wireless transceiver; the MPE proximity sensor; and a processor, communicatively coupled to the at least one memory, the at least one wireless transceiver and the MPE proximity sensor, configured to: measure an indication of operation of the MPE proximity sensor; determine whether the indication of operation of the MPE proximity sensor is less than a threshold; in response to a determination that the indication of operation of the MPE proximity sensor is less than the threshold, send a request for user messaging to an application processor; and issue an MPE proximity sensor failure alert.

In an embodiment, a mobile device for detecting a failure in a maximum permissible exposure (MPE) proximity sensor, may comprise: means for measuring an indication of operation of the MPE proximity sensor; means for determining whether the indication of operation of the MPE proximity sensor is less than a threshold; means for, in response to a determination that the indication of operation of the MPE proximity sensor is less than the threshold, sending a request for user messaging to an application processor; and means for issuing a MPE proximity sensor failure alert.

An embodiment may comprise a non-transitory computer-readable medium, having stored thereon computer-readable instructions to cause a processor on a mobile device to: measure an indication of operation of a maximum permissible exposure (MPE) proximity sensor; determine whether the indication of operation of the MPE proximity sensor is less than a threshold; in response to a determination that the indication of operation of the MPE proximity sensor is less than the threshold, send a request for user messaging to an application processor; and issue an MPE proximity sensor failure alert.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Power limits may be exceeded when the mobile device is transmitting at high Tx power with high beamforming gain. To prevent humans and other living creatures from being exposed to transmissions that exceed regulatory power limits, a mobile device, such as a 5G mobile device, may utilize an MPE proximity sensor to detect nearby living objects, enabling the mobile device to reduce power and/or switch to other protocols, such as 4G, when the device detects that a person or other living object is nearby. The ability to detect living persons and other living objects enhances device safety and regulatory compliance. In addition, the ability to detect when living objects are in proximity to the device enables the device to utilize higher power when not in proximity to living objects. Multiple types of sensors may be utilized for body proximity detection; for example, acoustic-based SONAR, Electro-magnetic-based (EM-based) RADAR, Infrared (IR)-based sensors, ultrasonic detectors or other object detection techniques. In some embodiments, a mobile device may also utilize existing millimeter wave radio frequency hardware (mmW RF-HW) to generate a RADAR-based detection scheme.

In various embodiments, 5G mm Wave (mmW) mobile devices will be equipped with some form of proximity or body detection sensors (herein referred to as Maximum Permissible Exposure (MPE) sensors) to ensure that the transmit power and associated power density measured on a human, such as the mobile device user, will not exceed regulatory limits imposed by various regulatory bodies, such as the FCC. Whether using a mmW-based, acoustic based, or capacitive-based sensor, there is the concrete possibility that the MPE proximity sensor may cease to function due to mechanical or electrical failure. Such a failure may be detected so that the mobile device does not exceed regulatory limits.

To address MPE proximity sensor failure and keep the mobile device within regulatory limits for exposure, a mobile device may include a maximum permissible exposure (MPE) sensor control unit to actively monitor the transmitted and received signals associated with the MPE proximity sensors to verify that the MPE proximity sensor is operating properly. Upon detecting an anomaly in any of these signals, such as a value drop below a given threshold or other indication that the MPE proximity sensor is not functioning properly, the MPE proximity sensor control unit 280 will inform the AP (application processor, or other processor or controller) which in would control a display on the device to show a warning message on informing the end user about the sensor malfunction, requesting that the device not be used and/or requesting that the device be repaired. In an embodiment, messages could comprise visible messages and/or alerts (warning text message, blinking screen, flashing LEDs), for example, on the display, vibration alerts or audible alerts (beeps, alarms, spoken warnings) or any combination thereof, to notify the user of an MPE proximity sensor failure condition. In some embodiments, the mobile device may switch to a 4G or WiFi link in response to the detected MPE threshold violations. There are several levels of verification/control at different stages in the transceiver that can be performed to assess correct functionality of the MPE proximity sensor, as detailed below.

In an embodiment, the MPE proximity sensor control unit may utilize hardware and/or software to detect an MPE proximity sensor transmitter circuitry fault. A fault in the MPE proximity sensor transmitter can be detected by monitoring the TxPwr at the transmitter power amplifier output. If it fails below a certain value or threshold ($T_H$) then it indicates that there is no or reduced transmitted signal power at the power amplifier (PA) 225 output and therefore, object detection capability has been either reduced or disabled. A measure of Tx_Pwr, as may be digitally sampled or provided by an analog to digital converter or otherwise measured, may be sent to the MPE proximity sensor control unit 280 which may trigger an alert to the application processor and hence, to the user.

In an embodiment, the MPE proximity sensor control unit may utilize hardware and/or software to detect an MPE proximity sensor receiver fault, for example, as may be inferred from modem or other processing. In an embodiment, a receiver fault detection algorithm may be augmented to also measure the power level of the mutual coupling (also known as Tx to Rx antenna coupling) signal energy between the transmit antenna 220 and the receive antenna 230 of the MPE proximity sensor, to detect if the MPE proximity sensor is transmitting properly. Because of transmit (Tx) to receive (Rx) antenna coupling, whenever the Tx antenna 220 transmits, the coupling energy should be detectable via the receive (Rx) antenna. In an embodiment, due to close proximity of the antennas, the level of energy associated with the mutual coupling is very high. In an embodiment the mutual coupling signal may be expected (e.g., permanent over time; or present whenever a Tx signal is present) due to the physics of the coupling mechanism. In case a failure was associated with the receiver circuitry, the energy level of the Tx-Rx coupling signal would fall below a certain threshold for a long time. This behavior can be readily detected, and the info passed to the MPE proximity sensor Control Unit which would take the respective actions. Furthermore, in an embodiment, the MPE proximity sensor signal generator may provide an operations status or a power status, either directly or via a processor, to the MPE proximity sensor control unit so that the MPE proximity sensor control unit can check for a Tx-Rx coupling signal whenever the MPE proximity sensor signal generator is operational and generating a signal.

In an embodiment, the MPE proximity sensor control unit may utilize hardware and/or software for H/V (horizontal/vertical) monitoring to add further coverage of the sensor health status. For some MPE proximity sensor embodiments, such as some types of RADAR, both the horizontal and vertical components of the signal should be operational for proper and accurate object detection to operate. In some embodiments, monitoring the transmitted/received signal level of H (horizontal) and/or V (vertical) polarization components may also be monitored to determine whether a failure of the MPE proximity sensor has occurred.

In an embodiment, the MPE proximity sensor control unit may utilize hardware and/or software for capacitive sensor monitoring to monitor the ambient current at the detector to check for anomalies in operational current. In an embodiment, an alternating voltage is applied to the capacitive sensor causing a corresponding current response at the MPE proximity sensor, which may be monitored to determine if it is within operational bounds relative to magnitude and direction of the current flow. In an embodiment, an MPE proximity sensor diagnostic routine could also modify the voltage signals across the capacitive sensors to verify that a commensurate current response is created and that the capacitive MPE proximity sensor is operating correctly. For example, a DC bias may be applied to generate a current response, or the magnitude of the alternating voltage applied to the MPE capacitive sensor may be varied to determine if the MPE capacitive sensor current similarly varies in proportion to the applied voltage.

Figure 1:
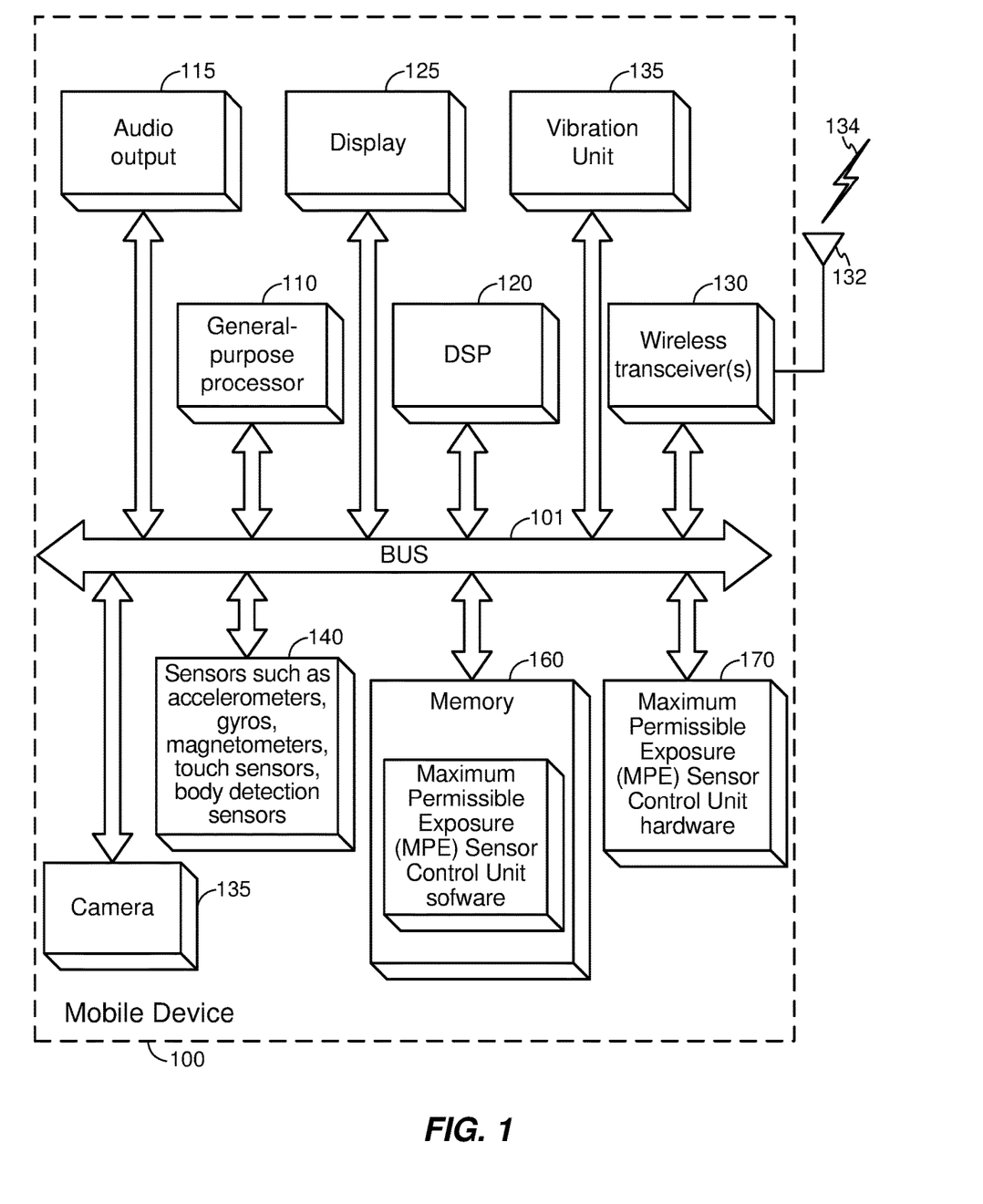
FIG. 1 is a device diagram illustrating an exemplary embodiment of a mobile device equipped with a maximum permissible exposure (MPE) sensors and an MPE control unit. The MPE unit may be implemented in hardware, software or combination thereof.

FIG. 1 illustrates one embodiment of a mobile device equipped with a maximum permissible exposure (MPE) sensor and MPE control unit. The unit may be implemented in hardware, software or combination thereof. Various technologies may be utilized to implement a proximity or other MPE proximity sensor, such as RADAR, infrared (IR), ultra-sound, SONAR, laser-based, camera-based, and capacitive-based sensor systems.

Figure 2:
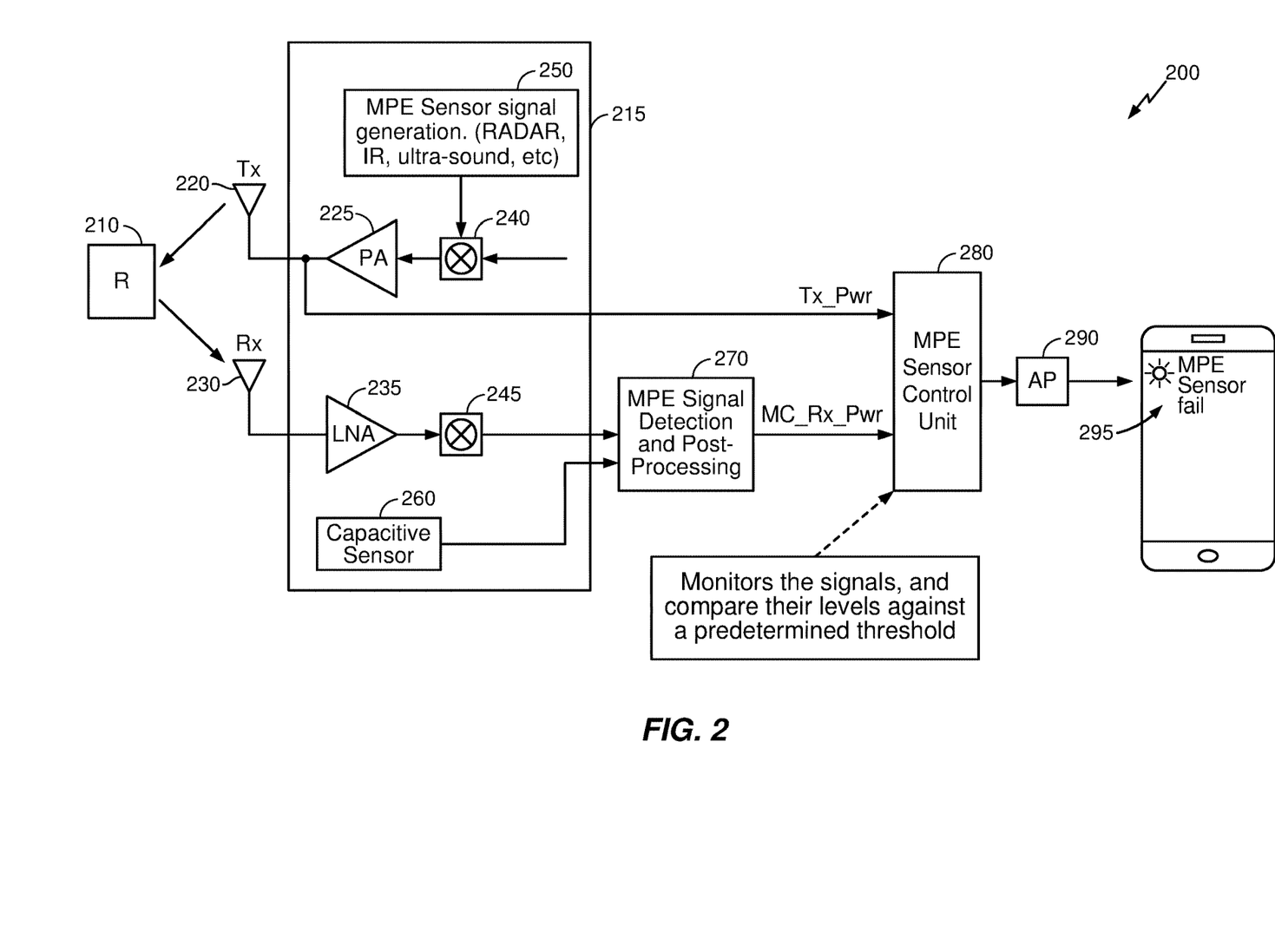
FIG. 2 is a device diagram illustrating an exemplary embodiment for an MPE proximity sensor-enabled device capable of generating a warning message or alert upon detecting a failure in status signals.

The methodologies described herein can be implemented by various means depending upon the application. For example, these methodologies can be implemented in hardware, firmware, software, or a combination thereof. For an implementation involving hardware, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination. The mobile device embodiment may include audio out 115, display 125 and/or vibration unit 135 or combination thereof or other output or alert capable mechanisms such as externally visible LEDs that may be utilized to output warning messages generated in response to MPE proximity sensor failure conditions or other conditions that may result in a failure of the mobile device to meet regulatory maximum permissible exposure (MPE) transmission power limits. MPE proximity sensor control, and MPE proximity sensor failure detection and generation of warning messages or other warning notification may be controlled by General-purpose processor 110, which may be an applications processor, a modem processor or other processor on the mobile device. Processing of signals and data or other processing may also occur in DSP 120. In an embodiment, signals may be sent and received via various wireless transceivers (or receivers) 130 over antenna(s) 132 with signals 134. There may be multiple wireless transceiver(s) or receivers 130 addressing different protocols and uses including wide area network (WAN), wireless local area network (WLAN), personal area network (PAN), and global navigational satellite systems (GNSS). These may include 5G transceivers and signals as well as other wireless technologies such as 4G/LTE, 3G, CDMA, GSM, WCDMA, WiFi, Bluetooth, and GNSS and/or satellite positioning systems (SPS) such as GPS, Galileo, GLONASS, BeiDou, NAVIC, QZSS and other wireless technologies. Motion and user use of the mobile device may be detected via various sensors 140 such as accelerometers, gyros, magnetometers, RADAR, SONAR, capacitive touch, touch sensors, ultrasonic detectors, infrared (IR) sensors and other body or object detection technologies that may be used to detect nearby living entities. Memory 160 may include maximum permissible exposure (MPE) sensor signal detection and signal post processing software and sensor control unit software and/or various detection algorithms and routines to be used in combination with various detection hardware, such as that described above and as illustrated in FIG. 2 and FIG. 3. The mobile device 100 may also contain dedicated or shared hardware for maximum Permissible Exposure (MPE) signal detection and signal post-processing hardware and sensor control unit hardware FIG. 2 illustrates an embodiment of mobile device 100 comprising means for an MPE proximity sensor and MPE proximity sensor control system as well as processing means and alert generation means and output means. The embodiment of FIG. 2 is most applicable to MPE proximity sensor implementations that rely on transmitted and reflected/received signals to detect living object (or other object) proximity. Examples of MPE proximity sensor implementations that rely on transmitted and reflected/received signals include RADAR, SONAR, IR, ultra-sound and light-based systems. Some embodiments described below, such as those relying on RF antenna coupling, are specific to RF-based systems while other embodiments such as those verifying output power, may be applied to the non-RF technologies as well.

As illustrated in FIG. 2, in an embodiment, a measure of the transmit power, Tx_Pwr, of the signals transmitted from the Maximum Permissible Exposure (MPE) sensor, are routed to the MPE proximity sensor control unit 280 that continuously checks the status of such signals to verify that the MPE proximity sensor is operating appropriately. In an embodiment, the MPE proximity sensor control unit verifies that the transmit power, Tx_Pwr, of the signals transmitted from the Maximum Permissible Exposure (MPE) sensor, do not fall below a threshold power level. The threshold power level is chosen as to be below normal operational MPE proximity sensor transmit levels. If/when the transmit power, Tx_Pwr, of the signals transmitted from the Maximum Permissible Exposure (MPE) sensor fall below a low signal threshold level (TL), as described above, the MPE proximity sensor control unit will send a message to the application processor (AP) or other processor which in turns displays a warning message on the display or otherwise generates a user alert. The warning message can be in the form of a blinking light, text message, audible alert or any other type of light/sound/vibration. The power output may be measured at the output of a power amplifier or for SONAR at the speaker or other sound emitting device or, for IR, at the infrared emitter/LED/lamp or other infrared light emitting device, or for ultra-sound at the ultrasonic emitter or, for light-based systems, at the LASER diode or other light emitting device. It is understood that output power may refer to signal power, light intensity, sound magnitude and/or other measures of output power. It is further understood that the receive antenna, in light-based systems, may be replaced by a camera or light detection assembly and, in sound-based systems, may be replaced by a microphone or other sound reception device(s).

In an embodiment, device 200, comprises transceiver 215, MPE proximity sensor control unit 280, MPE signal detection and post-processing unit 270, applications processor 290 and display 295. It is understood that, in an embodiment, signal detection and post processing may be performed by dedicated hardware and/or by a combination of processor 110 and memory 160. It is also understood that received signals may be stored and processed in memory 160 and may be processed by general purpose processor 110 and/or DSP 120.

Device 200 may be a mobile device such as a mobile phone, tablet, laptop, portable device, vehicle or other mobile wireless device. Mobile device 200 may send signals, using transmit (Tx) antenna 220, and receive reflected signals from a reflecting object (R) 210 such as a human, another living object or a non-living object, using receive (Rx) antenna(s) 230. It is understood that (Rx) antenna(s) 230 may comprise more than one antenna or may comprise a receiver array. Similarly, (Tx) antenna 220 may comprise one or more transmitters. Transceiver 215 comprises various components such as power amplifier (PA) 225, transmit mixer 240, transmit (Tx) antenna 220, receive (Rx) antenna 230, receive mixer 245, and capacitive sensor 260. The MPE proximity sensor may also comprise other components such as clock and modulation circuitry and/or IF circuitry (e.g., as the other input into the transmit mixer 240), which are not illustrated but which one skilled in the art would realize may be included. In an embodiment, the MPE proximity sensor may be implemented with EM-based RADAR for close proximity detection. In an embodiment, the MPE proximity sensor may also be implemented using acoustic-based SONAR, also including ultrasonic-based embodiments. It is understood that, if a non-EM-based implementation is selected such as an acoustic-based SONAR implementation, the transmit (Tx) antenna 220 and receive (RX) 230 antenna may be replaced respectively by, for example, one or more speakers and microphones. Similarly, in a light-based embodiment, the Tx antenna 220 may be replaced by a light emitting element such as an infrared LED emitter and the RX antenna 230 may be replaced by a light sensor or camera sensors.

Tx antenna 220 transmits signals boosted by power amplifier (PA) 225, which receives signals from transmit mixer 240. Receive (Rx) antenna 230 receives signals from reflector (R) 210, which may be a human, a living object or other object. The received signals are amplified using linear amplifier (LNA) 235 and input into receive mixer 245. It is understood that, in varying embodiments some of these elements may or may not be present or may be configured differently. For example, either of the mixers and/or an intermediate frequency (IF) input into the mixer may not be present.

In an embodiment, mutual coupling between the transmit (Tx) antenna 220 and receive (Rx) antenna 230 of the MPE proximity sensor may occur and the power level associated with the mutual coupling may be measured. For example, the output from the receive chain resulting from coupling of an MPE proximity sensor signal transmitted via the transmit chain may be detected and measured, in an embodiment, in MPE signal detection and post-processing unit 270. In an embodiment, the transmitted data signal from transmit antenna 220 results in mutual coupling signal energy in receive antenna 230. The mutual coupling signal energy between the transmit antenna 220 and receive antenna 230 may be monitored to detect failures associated with the receiver circuitry, based on a drop in the level of received coupling signal energy. Also, in an embodiment, the mutual coupling signal energy between the transmit antenna 220 and receive antenna 230 may be monitored to verify that transmit (TX) antenna 220 is also operational. If either the transmit chain or the receive chain fail, the device may fail to detect proximity to a human or other living object, and, therefore, detection of a transmit failure or a receive failure would result in notification of the user and/or shutdown of 5G new radio or other communication.

In an embodiment, the measured mutual coupling receive power MC_Rx_Pwr may be input into the MPE proximity sensor control unit 280, which may determine if power levels are within a threshold levels (and hence, the MPE proximity sensor is operational) or if the threshold power levels have been dropped below and if an alert should be sent out to an application processor (AP) 290 or other processing unit denoting an MPE proximity sensor failure. In another embodiment, transmit power, Tx_Pwr, may be measured directly at the output of the PA or other output device; for example using analog to digital or other sampling circuitry, wherein a measure of the transmit power, Tx_Pwr may be sent to the MPE proximity sensor control unit 280, to determine if the transmit power is above a higher threshold power (i.e., operational) or below a lower threshold power (i.e., not operational) which may, in an embodiment, mean that the proximity-based MPE proximity sensor is not working. If the Tx_Pwr drops below a lower threshold power, the proximity-based MPE proximity sensor control unit 280 would send an alert should be sent out to an application processor (AP) 290 or other processing unit noting that the MPE proximity sensor is not functioning. Note that various processors such as modem processors, application processor 110 and/or general purpose processors 110 and DSPs 120 may be utilized alone or in combination.

In an embodiment, transmit mixer 240 may be utilized to mix an intermediate frequency (IF) signal with the output from the MPE proximity sensor signal generator 250. The MPE proximity sensor signal generator 250 may be utilized to generate signals that are transmitted to detect reflecting objects such as humans and other living objects. Those signals, in an embodiment, may be monitored at the output of the PA 225, or using transmit to receive chain coupling, measured at the receive (RX) chain, to verify that proximity sensing is active and/or functional.

In an embodiment, a capacitive sensor such as capacitive sensor 260 may be utilized to determine if the mobile device is in contact with a human body or other living object. Proper operation of the capacitive sensor may be monitored by applying an alternative current to the capacitive sensor and monitoring the resulting current flow at the capacitive sensor to determine that the capacitive current flow is within expected levels. If the capacitive current flow is below a lower threshold ($T_L$), it may signify a failure of the capacitive sensor. If the capacitive current flow is above a higher threshold ($T_H$), it may signify the presence of a human or other living creature.

In an embodiment, other techniques to detect proximity with a human body such as through the use of cameras, motion detectors (such as accelerometers and/or gyros), and measuring rf field blockage from a known source may also be usable to detect the presence of a human body or of other living objects. When proximity to the human body is detected by the MPE proximity sensor control unit 280, the MPE proximity sensor control unit 280 will trigger monitoring and/or moderation and/or reduction of 5G NR or other transmit signal power levels to meet government mandated maximum permissible exposure (MPE) levels. Similarly, if failure of the MPE proximity sensor is detected, such as through low TX_Pwr power levels and/or low mutual coupling receive power (MC_Rx_Pwr) levels, the MPE proximity sensor control unit may trigger cancellation or blockage of 5GNR or other high power signal emissions.

Application processor (AP) 290, or other processor, will, in an embodiment, generate a user notification message if the Tx_Pwr levels and/or MC_Rx_Pwr levels fall below proximity-based MPE threshold power levels. A user warning notification may be displayed on display 295 and/or, in various embodiments, notification may include a flashing LED, device vibration, a transmit power back-off and/or device shut down or various combinations thereof.

In the case of a malfunction or breakdown of existing MPE proximity sensor devices, the malfunction or breakdown should be detected to avert a condition where 5GNR or other communication power levels exceed maximum permissible emission levels while a human or other living object is present, likely through communications transmitter shutdown or transmit power back-off and user notification of the fault condition(s).

In an embodiment, a transmitter circuitry fault may be detected by monitoring the Tx_Pwr at the transmitter output. If, in an embodiment, the Tx_Pwr falls below a certain lower threshold (TL), it may indicate that there is no transmitted signal power at the PA output and similarly if Tx_Pwr is above a higher threshold (Tx) it may signify a failure of the MPE proximity sensor system wherein the sensor system itself is emitting too much power (such as in a radar system where emissions of the system are similarly subject to regulatory maximum power limits). Either or both conditions may, in an embodiment, be detected based upon the measured Tx_Pwr, triggering the MPE proximity sensor control unit 280 to send an alert to the application processor (AP) 290 regarding an MPE proximity sensor failure and/or, in an embodiment where maximum transmit power (Tx) is exceeded, back-off on transmit power of the sensor or shut down wireless operation, depending on the severity of the fault and whether it can be adaptively addressed. Various circuitry embodiments may be utilized to measure the transmit power of the transceiver.

In an embodiment, a receiver fault may be inferred from modem processing. The detection algorithm may be augmented to measure the power level of the mutual coupling between the Tx antenna 220 and the Rx antenna 230. Due to close proximity of the antennas, the level of energy associated with the mutual coupling between the Tx antenna 220 and the Rx antenna 230 is very high and will remain high over time due to the physics of the coupling mechanism. In an embodiment, if a failure were associated with the receiver circuitry, the energy level of this signal would fall below a certain threshold (Tim) for long period of time (typically for the duration of the failure). The MPE signal detection and post-processing unit 270 measures the mutual coupling receive power energy levels (MC_Rx_Pwr) and sends the measured MC_Rx_Pwr to the MPE proximity sensor control unit. If the MC_Rx_Pwr measured power levels falls below a receive threshold ($T_{RL}$) detected by the MPE proximity sensor control unit 280, the receiver fault condition may cause a MPE proximity sensor fault alert to be generated by the MPE proximity sensor Control Unit 280 which would take the respective actions such as user notification (via the screen, LEDs blinking, vibration and/or audible alerts. If the receiver fault were not detected, and if the MPE proximity sensor proximity detection relies on the signal received via the receive antenna 230, a receiver fault could otherwise result in an undetected proximity condition of a human or other living creature and potentially result in an exceeding maximum permissible exposure (MPE) not being detected during 5GNR transmissions.

In an embodiment, horizontal and vertical signal components received at receive (Rx) antenna 230 may be monitored, and the level of the measured signal components compared against a threshold level(s). Appropriate horizontal and vertical signal component levels are useful to accurately measure distance/proximity. Monitoring the horizontal and vertical components of the signal (H/V monitoring) enables verification of proper operation of the MPE-based proximity detection, wherein the received signal level of horizontal and/or vertical polarization components are both monitored to verify proper operation of the MPE proximity sensor-based proximity detection and notification of the user and/or shutdown of the 5G NR radio.

In an embodiment, the voltage signals across the capacitive sensor(s) 260 may be controlled to ensure that the sensor is operating and therefore properly gating operation of the MPE signal detection and post-processing unit 270 and/or the MPE proximity sensor control unit 280. For example, when an alternating voltage is applied to the capacitive sensors 260, it creates an alternating electric current based upon the charge migration across the two plates of the capacitor. When an object or person is proximal/near to the capacitive sensor 260 it will result in an increase in capacitance and an increase in current flow. The alternating current is detected by capacitive sensor 260. Similarly, if the capacitive sensor 260 is operating properly, increasing or decreasing the magnitude of the alternating voltage will result in an increase or decrease, respectively, in the amount of current flow, enabling the proper operation of the capacitive sensor 260 to be verified. If the current flow resulting from the ambient operating voltage drops below a threshold current level for capacitive current flow, ($T_{CFL}$), the MPE signal detection and post processing unit 270 will forward MC_TX_PWR measurements to the MPE proximity sensor control unit 280 which may determine that the capacitive sensor may be disabled and alert an applications processor AP 290 which will cause an alert message to be generated on a display, via audio, vibration or other alert mechanisms and/or shut down 5G NR operation.

Figure 3:
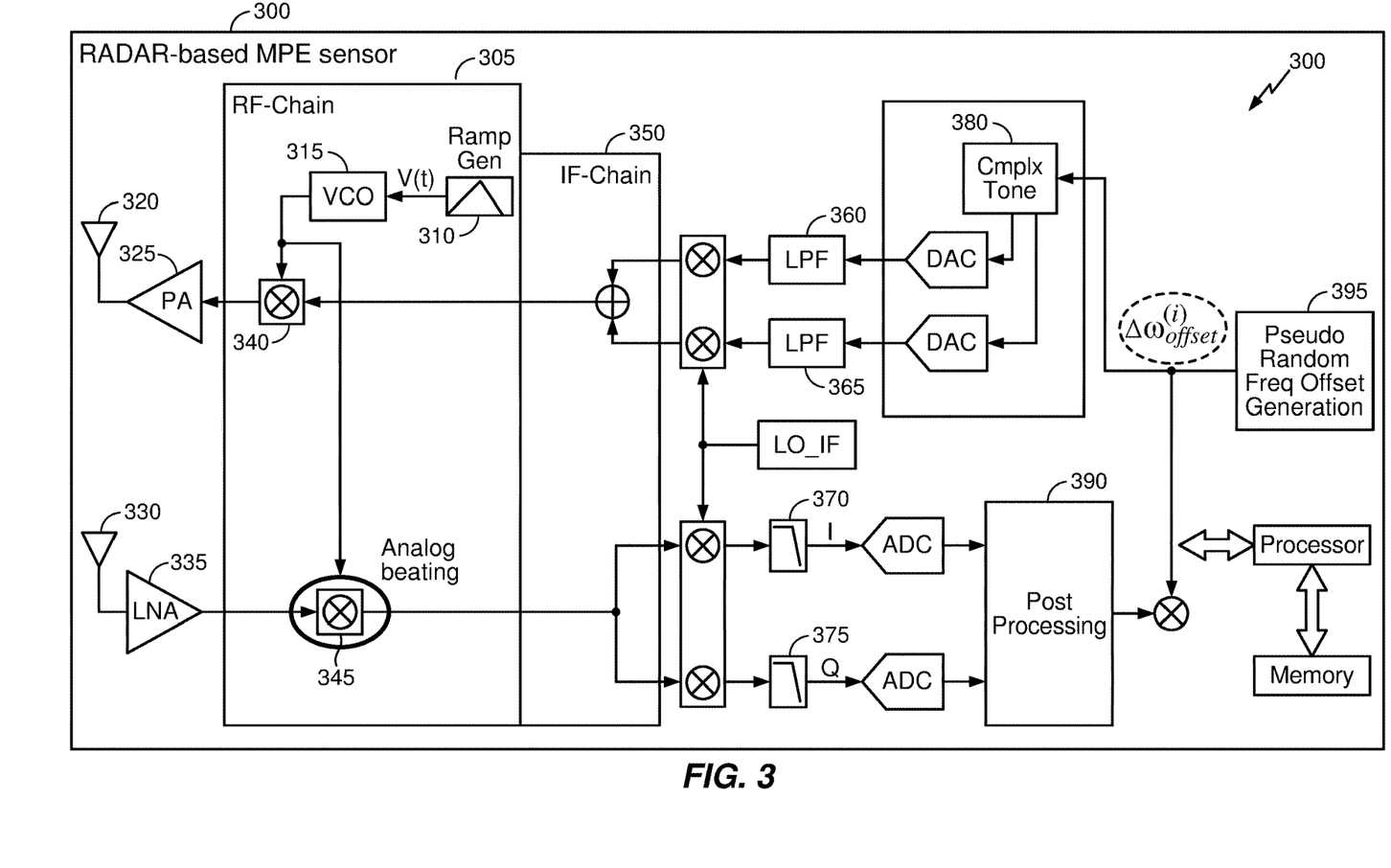
FIG. 3 is a device diagram illustrating an exemplary embodiment of a mobile device containing a RADAR-based MPE proximity sensor control unit capable of detecting a failure in the MPE proximity sensor.

FIG. 3 illustrates, in an embodiment, an example implementation of an EM RADAR-based MPE proximity sensor system that may be utilized in mobile device 100 to detect proximity of living objects and/or other objects to shut down 5G NR emitted power operation or otherwise back off on 5G NR emitted power. It is understood that post processing may be performed in a DSP 120, a general-purpose processor 110 and memory 160 or in any combination thereof or various combinations of dedicated or shared hardware, processor and software. In FIG. 3, mobile device 300 utilizes a EM Radar-based MPE proximity sensor. The EM Radar-based MPE proximity sensor comprises a transceiver 305 which comprises a Tx antenna 320, a PA 325, an Rx antenna 330, a low noise amplifier, LNA 335, a transmit mixer (the upper mixer in the drawing), mixer 340, receive mixer: 345, ramp gen 310, VCO 315, IF Chain 350, LPF (Low pass filter): 360 and 365, down conversion to I and Q, 370 and 375, complex tone generator 380, post processing 390 and pseudo-random frequency offset generation 395.

Figure 4:
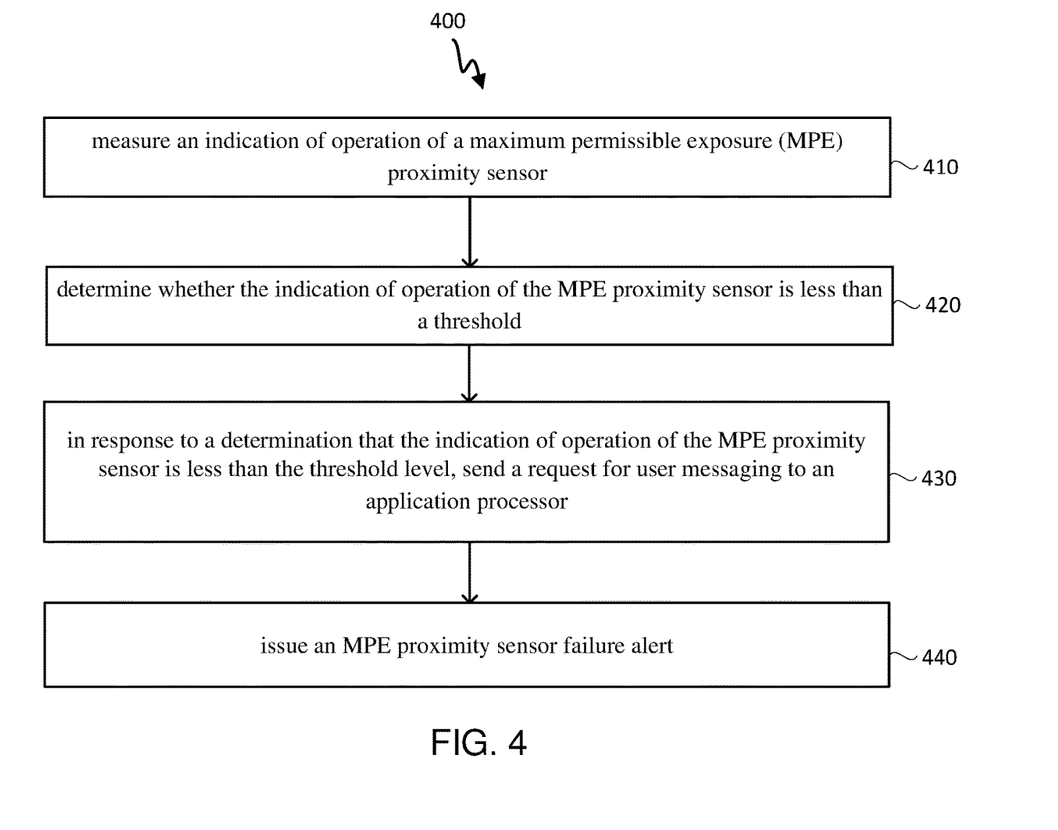
FIG. 4 illustrates a process to detect operational faults in a maximum permissible exposure proximity sensor.

FIG. 4 shows a flow chart 400 illustrating an example implementation of a mobile device comprising an MPE proximity sensor which detects MPE proximity sensor faults and issues a failure alert. In various embodiments, the MPE proximity sensor may use RADAR, SONAR, ultrasonic object detection, infrared sensors, capacitive sensors, cameras, rangefinders, a light sensor, a camera, a LIDAR receiver, or a motion sensor and other range detection or movement detection devices. In step 410, the mobile device measures an indication of operation of a maximum permissible exposure (MPE) proximity sensor. In various embodiments of maximum permissible exposure (MPE) proximity sensors, the indication of operation of a maximum permissible exposure (MPE) proximity sensor may be an indication of transmit and/or output power, transmit and/or output voltage, receive and/or input power such as mutual coupling power between transmit and receive chains, or power associated with reflected transmitted signal power received at a receive chain, or a measure of current flow, such as current between the different sides of a capacitive sensor, or a measure of light intensity of reflected light, or of reflected light at a particular frequency or band, or a measure of reflected sound (magnitude or volume), or the magnitude of reflected sound at a particular frequency band. Various other indications of reflected power of a proximity detection signal or other indications of the operations of a proximity detection sensor may also be utilized.

In step 420, in an embodiment, it is determined whether the indication of operation of the MPE proximity sensor is less than a threshold. In an embodiment, the measured indication of operation of the maximum permissible exposure (MPE) proximity sensor is compared to a threshold level. The threshold level may be determined based on a power below which the maximum permissible exposure (MPE) proximity sensor may not be operating or is, at least, not operating properly. In some embodiments the threshold level may be predetermined. In some embodiments, the threshold level may be programmed into non-transitory memory on the mobile device. In some embodiments, the threshold level may be calibrated based on observed operational levels.

In an embodiment, in FIG. 2, Tx_Pwr above a threshold level is an indication that transmit signals are being emitted by the MPE proximity sensor and a lack of Tx_Pwr or Tx_Pwr below a threshold power level indicates that the transmit signal of the maximum permissible exposure (MPE) proximity sensor is not being transmitted or is not being transmitted at appropriate power levels. In an embodiment, the mutual coupling receive power, MC_Rx_Pwr, a measure of the power coupling between the transmit and receive chains, may also be utilized as a measure of transmit power and therefore as an indication of operation of the MPE proximity sensor. MC_Rx_Pwr below a power threshold may indicate that the MPE proximity sensor is not in operation and may be an alternative or redundant measure of transmit power. In various embodiments, other indications that are related to operation of the MPE proximity sensor such as output voltage or receive voltage and voltage thresholds may be utilized. In some embodiments, power below a threshold power or voltage below a voltage threshold would indicate that the MPE proximity sensor is not operating or not operating properly. Similarly, in some embodiments, a measure of current may be utilized, where current below a threshold or peak current below a threshold indicates that an MPE proximity sensor is not operating properly. For example, in a capacitive MPE proximity sensor, a measure of current flow between the oppositely charged sides of the capacitor, indicates that the capacitive MPE proximity sensor is operating. If there is no or minimal current flow between the oppositely charged sides of the capacitor, as an alternating voltage is applied to the capacitive MPE proximity sensor, then the capacitive MPE proximity sensor is not operating or not operating properly. In an infrared MPE proximity sensor, emitted light measured at the emitting infrared diode is a measure of operation of an infrared MPE proximity sensor. Similarly, in a laser-based range-finding implementation, emitted light measured at the laser output would be a measure of operation of a laser-based MPE proximity sensor. In a sound-based maximum permissible exposure (MPE) proximity sensor such as an ultrasonic maximum permissible exposure (MPE) proximity sensor or an audible maximum permissible exposure (MPE) proximity sensor, both sound levels measured at the speaker or sound levels measured at the receiver/microphone that is received directly by the microphone or other sonic receiver (versus a reflected signal from a "reflector" such as a human or other living object) is an indication that an sonic-based and/or ultra-sonic-based proximity detector is operating. In an embodiment, multiple maximum permissible exposure (MPE) proximity sensor technologies may be utilized in the same mobile device. For example, a mobile device may have both a capacitive sensor and a ranged maximum permissible exposure (MPE) proximity sensor such as a RADAR, IR, ultrasound, LIDAR, light or other ranged maximum permissible exposure (MPE) proximity sensor. In an embodiment, if multiple maximum permissible exposure (MPE) proximity sensors are utilized in a mobile device, it may require failure of all or multiple MPE proximity sensors, as indicated by the measured indications of operation, before communications transmissions are terminated or user warning messages are issued by the applications processor 290 or other processor via various output devices.

It is understood that, in an embodiment, the transmit output may be pulsed or otherwise vary in value, and that the receive input values may vary accordingly. Similarly, a measured current may be induced based upon an alternating or otherwise varying voltage or other stimulus and, in an embodiment, the indication of operation may be a peak current or an average current or an RMS current or other measure of operation over time. In an embodiment, the indication of operation of the maximum permissible exposure (MPE) proximity sensor may be a peak value or, in an embodiment, the indication of operation of the maximum permissible exposure (MPE) proximity sensor may be an average value or an RMS value or other indications of power and/or operation over time.

In step 430, in response to the indication of operation of a maximum permissible exposure (MPE) proximity sensor dropping below the threshold, the MPE sensor control unit or other sensor monitoring and/or control unit sends a request for user messaging to an application processor 290 or other processing device. As noted above, if the measured indication of operation is below or less in value than the threshold, it indicates that the MPE proximity sensor is not operating or not operating properly.

In step 440, the application processor 290 or other processor, which has received notification or otherwise determined that the indication of operation of the maximum permissible exposure (MPE) proximity sensor is below a threshold value, will issue an MPE proximity sensor failure alert, outputting an notification that the MPE proximity sensor is not operating properly. The alert may be displayed visibly via the display, such as a written message, or the alert may be sent audibly via a speaker such as a verbal alert or an audible tone or sequence of tones, or sent visibly via a flashing LED or other light, or sent via a tactile notice such as a vibration, or some combination thereof. In some embodiments, the mobile device may, either in combination with notification to a user or instead of notification of the user, turn off or disable the 5G new radio transceiver or other wireless communications transceiver. In some embodiments, the mobile device may, either in combination with notification to a user or instead of notification of the user, reduce transmission power from the 5G new radio transceiver or other wireless transceiver to or below maximum transmission power levels mandated when operating in the presence of a human being in close proximity. In some embodiments, when the mobile device disables the 5G new radio transceiver or reduces transmission power at the 5G new radio transceiver, the mobile device may activate or otherwise utilize a non-5G new radio transceiver such as a 4G LTE WAN transceiver or a 3G WAN transceiver or a WiFi transceiver or a Bluetooth transceiver or combination thereof to maintain communication. In some embodiments the transfer of a communication session and/or session bandwidth from 5G to a non-5G new radio (NR) transceiver may be implemented as either a hard handoff or a soft handoff or may be implemented to reduce data transfer rate over 5G NR and to coordinate the flow of data across multiple simultaneous sessions across multiple radio access networks. In an embodiment, a MPE proximity sensor failure and/or a detection of a human or other living object in proximity to the mobile device may trigger the mobile device to reduce data transfer rate over 5G NR and to coordinate the flow of data across multiple simultaneous sessions across multiple radio access networks.

If the indication of operation of the maximum permissible exposure (MPE) proximity sensor indicates that the MPE proximity sensor is operating in step 420 (e.g., the indication of operation of a maximum permissible exposure (MPE) proximity sensor is above the threshold and/or above a higher operations threshold), the MPE proximity sensor is utilized to detect proximity of a human and/or other living object. In response to detection of proximity of a human and/or other living object by the MPE proximity sensor, the mobile device may, in an embodiment, switch to a different mode of communications such as from 5G NR to 4G LTE or to WiFi or Bluetooth. In an embodiment, the mobile device may, as an alternative, turn off transmission capability if all maximum permissible exposure (MPE) proximity sensors fail.

The methods and/or operations performed in flow chart 400, may be implemented in hardware, software and various means for and combinations thereof. It is understood that the device diagrams in FIGS. 1-3 are example embodiments and are that one skilled in the art may implement the methods and/or operations performed in flow chart 400 using the means of FIGS. 1-3 or using other means and/or variants of the illustrated embodiments thereof.

For an implementation involving firmware and/or software, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

In an implementation involving firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Examples of network technologies that may support wireless transceivers 130 are Global System for Mobile Communications (GSM), Code Division Multiple Access (CDMA), Wideband CDMA (WCDMA), Long Term Evolution LTE), $5^{th}$ Generation Wireless (5G) or New Radio Access Technology (NR), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. WAN wireless transceivers may comprise deployments of equipment providing subscriber access to a wireless telecommunication network for a service (e.g., under a service contract). Here, a WAN wireless transceiver may perform functions of a wide area network (WAN) or cell base station in servicing subscriber devices within a cell determined based, at least in part, on a range at which the WAN wireless transceiver is capable of providing access service. Examples of WAN base stations include GSM™, WCDMA™, LTE™, CDMA™, HRPD™ WiFi™, BT, WiMax™, and/or $5^{th}$ Generation (5G) base stations. In an embodiment, further wireless transceivers 130 may comprise a wireless LAN (WLAN) and/or PAN transceiver. In an embodiment, mobile device 100 may contain multiple wireless transceivers including WAN, WLAN and/or PAN transceivers. In an embodiment, radio technologies that may support wireless communication link or links may further comprise Wireless local area network (e.g., WLAN, e.g., IEEE 802.11), Bluetooth™ (BT) and/or ZigBee™.

A mobile device (e.g., MS or STA or SET) refers to a device such as a cellular or other wireless communication device and/or Internet of Things (IoT) device, personal communication system (PCS) device, personal navigation device (PND), Personal Information Manager (PIM), Personal Digital Assistant (PDA), laptop, tablet, netbook, smartbook, smartphone or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." The terms "mobile station" and "mobile device" are often used interchangeably.

This disclosure includes example embodiments; however, other implementations can be used. Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, FLASH, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of detecting a failure in a maximum permissible exposure (MPE) proximity sensor, comprising:
   generating signals that are transmitted to detect reflecting objects;
   monitoring the generated signals;
   determining, based upon the monitored generated signals, that the MPE proximity sensor is not functioning; and
   issuing an MPE proximity sensor failure alert.

2. The method of claim 1, wherein the monitored generated signals are measured at an output of a power amplifier (PA).

3. The method of claim 1, wherein the monitored generated signals are measured at a receive chain.

4. The method of claim 3, wherein the monitored generated signals measured at the receive chain are the generated signals coupled from the transmit chain to the receive chain.

5. The method of claim 1, wherein the determining, based upon the monitored generated signals, that the MPE proximity sensor is not functioning is based upon a change in signal parameters.

6. The method of claim 5, wherein the change in signal parameters is detected based upon a predetermined threshold.

7. The method of claim 1, wherein the MPE proximity sensor utilizes radio detection and ranging (RADAR).

8. A mobile device for detecting a failure in a maximum permissible exposure (MPE) proximity sensor, comprising:
   at least one memory;
   at least one wireless transceiver;
   the MPE proximity sensor; and
   a processor, communicatively coupled to the at least one memory, the at least one wireless transceiver and the MPE proximity sensor, configured to:
      generate signals that are transmitted to detect reflecting objects;
      monitor the generated signals;
      determine, based upon the monitored generated signals, that the MPE proximity sensor is not functioning; and
      issue an MPE proximity sensor failure alert.

9. The mobile device of claim 8, wherein the monitored generated signals are measured at an output of a power amplifier (PA).

10. The mobile device of claim 8, wherein the monitored generated signals are measured at a receive chain.

11. The mobile device of claim 10, wherein the monitored generated signals measured at the receive chain are the generated signals coupled from the transmit chain to the receive chain.

12. The mobile device of claim 8, wherein the determination, based upon the monitored generated signals, that the MPE proximity sensor is not functional, is based upon a change in signal parameters.

13. The mobile device of claim 12, wherein the change in signal parameters is detected based upon a predetermined threshold.

14. The mobile device of claim 8, wherein the MPE proximity sensor utilizes radio detection and ranging (RADAR).

15. A mobile device for detecting a failure in a maximum permissible exposure (MPE) proximity sensor, comprising:
   means for generating signals that are transmitted to detect reflecting objects;
   means for monitoring the generated signals;
   means for determining, based upon the monitored generated signals, that the MPE proximity sensor is not functioning; and
   means for issuing an MPE proximity sensor failure alert.

16. The mobile device of claim 15, wherein the monitored generated signals are measured at an output of a power amplifier (PA).

17. The mobile device of claim 15, wherein the monitored generated signals are measured at a receive chain.

18. The mobile device of claim 17, wherein the monitored generated signals measured at the receive chain are the generated signals coupled from the transmit chain to the receive chain.

19. A non-transitory computer-readable medium, having stored thereon computer-readable instructions to cause a processor on a mobile device to:
   generate signals that are transmitted to detect reflecting objects;
   monitor the generated signals;
   determine, based upon the monitored generated signals, that the MPE proximity sensor is not functioning; and
   issue an MPE proximity sensor failure alert.

20. The non-transitory computer-readable medium of claim 19, wherein the monitored generated signals are measured at an output of a power amplifier (PA).

* * * * *